United States Patent
Yoo et al.

(10) Patent No.: US 12,234,948 B2
(45) Date of Patent: Feb. 25, 2025

(54) PRESSURE VESSEL ASSEMBLY AND PRESSURE VESSEL PROTECTOR

(71) Applicants: Hyundai Motor Company, Seoul (KR); Kia Corporation, Seoul (KR)

(72) Inventors: Seon Woo Yoo, Ulsan (KR); Cheol Hwan Kim, Yongin-si (KR)

(73) Assignees: Hyundai Motor Company (KR); Kia Corporation (KR)

( * ) Notice: Subject to any disclaimer, the term of this patent is extended or adjusted under 35 U.S.C. 154(b) by 40 days.

(21) Appl. No.: 17/874,916

(22) Filed: Jul. 27, 2022

(65) Prior Publication Data
US 2023/0304633 A1    Sep. 28, 2023

(30) Foreign Application Priority Data
Mar. 24, 2022   (KR) .................. 10-2022-0036903

(51) Int. Cl.
F17C 1/04    (2006.01)

(52) U.S. Cl.
CPC ........ *F17C 1/04* (2013.01); *F17C 2201/0109* (2013.01); *F17C 2203/012* (2013.01); *F17C 2203/0604* (2013.01); *F17C 2203/0619* (2013.01); *F17C 2203/066* (2013.01); *F17C 2221/012* (2013.01); *F17C 2270/0105* (2013.01); *F17C 2270/0184* (2013.01); *F17C 2270/0186* (2013.01)

(58) Field of Classification Search
CPC .............. F17C 2205/0308; F17C 1/04; F17C 2201/0109; F17C 2203/012; F17C 2203/0604; F17C 2203/0619; F17C 2203/066; F17C 2221/012; F17C 2270/0105; F17C 2270/0184; F17C 2270/0186; F17C 1/06; F17C 2209/234; F17C 205/0115; Y02E 60/32
USPC ....................................... 220/581
See application file for complete search history.

(56) References Cited

U.S. PATENT DOCUMENTS

| 4,022,343 A * | 5/1977 | Richardson ............ B65D 59/06 |
| | | 206/521 |
| 8,297,468 B1 * | 10/2012 | DeLay .................... F17C 1/06 |
| | | 220/586 |
| 10,001,247 B2 | 6/2018 | Shima et al. |

(Continued)

FOREIGN PATENT DOCUMENTS

| KR | 100937520 | 1/2010 |
| KR | 20130017118 | 2/2013 |

(Continued)

*Primary Examiner* — Don M Anderson
*Assistant Examiner* — Laura E. Parker
(74) *Attorney, Agent, or Firm* — Fish & Richardson P.C.

(57) ABSTRACT

A pressure vessel assembly includes a pressure vessel including a cylinder, a first side dome provided at one end of the cylinder, and a second side dome provided at the other end of the cylinder, a first protector that surrounds an outer surface of the first side dome, a second protector that surrounds an outer surface of the second side dome, and a connector that connects the first protector and the second protector such that the pressure vessel is interposed between the first protector and the second protector. The pressure vessel assembly can help to prevent damage and breakage of the pressure vessel caused by external impact and improve safety and reliability of the pressure vessel.

13 Claims, 6 Drawing Sheets

(56) References Cited

U.S. PATENT DOCUMENTS

| | | | |
|---|---|---|---|
| 10,520,135 B2 | 12/2019 | Shima et al. | |
| 10,837,602 B2 | 11/2020 | Takagi et al. | |
| 2011/0143222 A1* | 6/2011 | Oelerich | H01M 8/04201 |
| | | | 280/830 |
| 2012/0234840 A1* | 9/2012 | Strassburger | B29C 70/24 |
| | | | 156/196 |
| 2017/0234487 A1 | 8/2017 | Shima et al. | |
| 2017/0254477 A1* | 9/2017 | Schimenti | F17C 13/06 |
| 2018/0259126 A1 | 9/2018 | Shima et al. | |
| 2019/0226641 A1* | 7/2019 | Ogiwara | F17C 13/12 |
| 2021/0129662 A1 | 5/2021 | Beckner et al. | |
| 2023/0081419 A1* | 3/2023 | VanOyen | F17C 1/06 |
| | | | 220/581 |
| 2023/0175646 A1* | 6/2023 | Takano | F16J 13/24 |
| | | | 220/581 |

FOREIGN PATENT DOCUMENTS

| | | |
|---|---|---|
| KR | 20130032186 | 4/2013 |
| KR | 20170042230 | 4/2017 |
| KR | 101920334 | 2/2019 |
| KR | 102094158 | 4/2020 |

\* cited by examiner

PRESSURE VESSEL ASSEMBLY AND PRESSURE VESSEL PROTECTOR

CROSS-REFERENCE TO RELATED APPLICATION

This application claims priority to and the benefit of Korean Patent Application No. 10-2022-0036903, filed in the Korean Intellectual Property Office, on Mar. 24, 2022, the entire contents of which are incorporated herein by reference.

TECHNICAL FIELD

The present disclosure relates to a pressure vessel assembly and a pressure vessel protector, and more particularly, to a pressure vessel assembly and a pressure vessel protector, which are capable of inhibiting damage to and breakage of a pressure vessel and improving safety and reliability of the pressure vessel.

BACKGROUND

A hydrogen vehicle (e.g., a passenger vehicle or a commercial vehicle) may generate electricity by a chemical reaction between hydrogen and oxygen and travel by operating a motor with the electricity. For example, the hydrogen vehicle may include a pressure vessel configured to store hydrogen ($H_2$), a fuel cell stack configured to produce electricity by an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

In some cases, a TYPE 4 pressure vessel may be used as the pressure vessel of the hydrogen vehicle. The TYPE 4 pressure vessel may include a liner (made of e.g., a nonmetallic material), and a carbon fiber layer made by winding a carbon fiber composite material around an outer surface of the liner.

In some cases, because of characteristics of the structure of the pressure vessel in which two opposite side parts of the pressure vessel each have a dome shape, it may be difficult to wind a carbon fiber composite material, with a sufficient thickness, around the side part of the pressure vessel. In some cases, it may be difficult to ensure sufficient structural rigidity of the side part of the pressure vessel.

In some cases, the pressure vessel may be easily damaged or broken by an impact (e.g., impact caused by a rollover accident of a vehicle) applied to the side part of the pressure vessel. In some cases, a risk of a leak of hydrogen may increase, and safety and reliability of the pressure vessel may be deteriorated.

In some cases, a method may additionally provide a fiberglass layer around a periphery (an outer surface) of a carbon fiber layer in order to ensure structural rigidity of the pressure vessel (rigidity of the side part).

In some cases, a complicated process of winding fiberglass around the periphery of the carbon fiber layer and then curing the fiberglass in a separate heat treatment chamber may be performed in order to provide the fiberglass layer around the periphery of the carbon fiber layer. The manufacturing process may be complicated, manufacturing efficiency may be degraded, and manufacturing costs may be increased.

In some cases, where the carbon fiber layer and the fiberglass layer are made of different materials, the amount of expansion of the carbon fiber layer and the amount of expansion of the fiberglass layer may be different from each other when the pressure vessel is expanded (e.g., when the pressure vessel is charged with hydrogen). In some cases, abnormal noise may occur as a close-contact state between the carbon fiber layer and the fiberglass layer is eliminated (an inner surface of the fiberglass layer is separated from an outer surface of the carbon fiber layer).

Various studies have been conducted to ensure structural rigidity of the pressure vessel and improve safety and reliability of the pressure vessel.

SUMMARY

The present disclosure describes a pressure vessel assembly and a pressure vessel protector that can help to prevent damage to and breakage of a pressure vessel and improve safety and reliability of the pressure vessel.

In particular, the present disclosure can improve structural rigidity and durability of a side part of a pressure vessel. In some examples, a protector can contact a side part of a pressure vessel without using a separate bonding agent. In some examples, the present disclosure can help to reduce a weight and size of a pressure vessel.

In addition, the present disclosure describes simplifying a manufacturing process and shortening a manufacturing time to thereby improve manufacturing efficiency and reduce manufacturing costs.

According to one aspect of the subject matter described in this application, a pressure vessel assembly includes a pressure vessel that includes a cylinder, a first side dome that is disposed at a first end of the cylinder and defines a first dome shape, and a second side dome that is disposed at a second end of the cylinder and defines a second dome shape. The pressure vessel assembly further includes a first protector that surrounds an outer surface of the first side dome, a second protector that surrounds an outer surface of the second side dome, the pressure vessel being disposed between the first protector and the second protector, and a connector that connects the first protector and the second protector to each other.

Implementations according to this aspect can include one or more of the following features. For example, the pressure vessel assembly can further include a plurality of first connection portions that are disposed at the first protector and connected to a first end of the connector, and a plurality of second connection portions that are disposed at the second protector and connected to a second end of the connector. In some examples, the plurality of first connection portions can be made of a material having a higher rigidity than a material of the first protector, and the plurality of second connection portions can be made of a material having a higher rigidity than a material of the second protector.

In some implementations, the connector can include a connection wire having a first end connected to the first protector and a second end connected to the second protector. In some implementations, the connector can include a connection wire that connects the first protector to the second protector, where the connection wire defines a continuous zigzag pattern that alternately extends (i) from a portion of the first protector to a portion of the second protector and (ii) from the portion of the second protector to another portion of the first protector. In some implementations, the connector can include a plurality of connection wires that connect the first protector to the second protector and are spaced apart from one another in a circumferential direction of the cylinder. For instance, the plurality of connection wires can extend from the first protector to the second protector along an axial direction of the cylinder.

In some implementations, the first protector can include a first reinforcing sheet that surrounds the outer surface of the first side dome, and a first impregnation layer that can include a first impregnant disposed in the first reinforcing sheet. In some examples, the first reinforcing sheet can include at least one of woven fiberglass fabric or polyurethane foam, and the first impregnant can include polyurea resin. In some implementations, the second protector can include a second reinforcing sheet that surrounds the outer surface of the second side dome, and a second impregnation layer that can include a second impregnant disposed in the second reinforcing sheet. In some examples, the second reinforcing sheet can include at least one of woven fiberglass fabrics or polyurethane foam, and the second impregnant can include polyurea resin.

In some implementations, the connector can be in contact with an outer circumferential surface of the cylinder. In some implementations, the pressure vessel can include a liner that defines a storage space therein and a carbon fiber layer that surrounds an outer surface of the liner, where the carbon fiber layer has an outer surface that defines at least a portion of the cylinder, the first side dome, or the second side dome. The first protector can surround a first portion of the outer surface of the carbon fiber layer defining the first side dome, and the second protector can surround a second portion of the outer surface of the carbon fiber layer defining the second side dome.

According to another aspect, a pressure vessel protector for a pressure vessel is described. The pressure vessel includes a cylinder, a first side dome that is disposed at a first end of the cylinder and defines a first dome shape, and a second side dome that is disposed at a second end of the cylinder and defines a second dome shape. The pressure vessel protector includes a first protector configured to surround an outer surface of the first side dome, a second protector configured to surround an outer surface of the second side dome, and a connector configured to connect the first protector and the second protector to each other such that the pressure vessel is disposed between the first protector and the second protector.

Implementations according to this aspect can include one or more of the following features. For example, the pressure vessel protector can further include a plurality of first connection portions that are disposed at the first protector and connected to a first end of the connector, and a plurality of second connection portions that are disposed at the second protector and connected to a second end of the connector.

In some implementations, the connector can include a connection wire having a first end connected to the first protector and a second end connected to the second protector. In some implementations, the connector can include a connection wire that connects the first protector to the second protector, where the connection wire defines a continuous zigzag pattern that alternately extends (i) from a portion of the first protector to a portion of the second protector and (ii) from the portion of the second protector to another portion of the first protector. In some implementations, the connector can include a plurality of connection wires that connect the first protector to the second protector and are spaced apart from one another in a circumferential direction of the cylinder.

In some implementations, the first protector can include a first reinforcing sheet configured to surround the outer surface of the first side dome, and a first impregnation layer that can include a first impregnant disposed in the first reinforcing sheet. The second protector can include a second reinforcing sheet configured to surround the outer surface of the second side dome, and a second impregnation layer can include a second impregnant disposed in the second reinforcing sheet. In some examples, each of the first reinforcing sheet and the second reinforcing sheet can include at least one of woven fiberglass fabric or polyurethane foam, where each of the first impregnant and the second impregnant can include polyurea resin.

In some implementations, the protectors (the first protector and the second protectors) can be provided to cover the outer surfaces of the side parts (the first side dome and the second side part). Therefore, it can be possible to obtain an advantageous effect of ensuring structural rigidity of the side part, minimizing impact to be transmitted to the pressure vessel when the impact is generated by an accident or the like, and minimizing damage to and breakage of the pressure vessel.

In some implementations, the protector can be provided to cover the outer surface of the side part. Therefore, it can be possible to ensure structural rigidity of the pressure vessel without additionally providing a carbon fiber layer and other reinforcing layers (e.g., fiberglass layers) on the outer surface of the side part (the outer surface of the carbon fiber layer). Therefore, it can be possible to obtain an advantageous effect of simplifying the structure and the manufacturing process. Moreover, in some examples, a fiberglass layer may not be provided on the outer surface of the carbon fiber layer. Therefore, it can be possible to help to prevent the occurrence of abnormal noise caused by the difference in the amount of expansion between the carbon fiber layer and the fiberglass layer when the pressure vessel is expanded.

In some implementations, the protector can be mechanically fixed to the side part of the pressure vessel by the connector without a separate bonding agent, such that a bonding process using a bonding agent can be excluded. Therefore, it can be possible to simplify the structure and the manufacturing process and more securely and stably maintain the arrangement state of the protector with respect to the pressure vessel.

In some examples, the pressure vessel can have various structures in accordance with conditions and design specifications. For instance, the pressure vessel can include a liner having a storage space therein and a carbon fiber layer surrounding an outer surface of the liner. Various members capable of mechanically connecting the first protector and the second protector can be used as the connector. For example, a connection wire having one end connected to the first protector and the other end connected to the second protector can be used as the connector.

In some examples, the connection wire can connect the first protector and the second protector in various ways in accordance with conditions and design specifications. For instance, the connection wire can be provided in plural, and the plurality of connection wires can be spaced apart from one another in a circumferential direction of the cylinder part so that the plurality of connection wires is disposed like tightening cords used for the janggu (a traditional Korean musical instrument). In some examples, the connection wire can extend in a continuous zigzag manner while being alternately connected to the first protector and the second protector.

The connection structure for connecting the first protector and second protector and the connector can be variously changed in accordance with conditions and design specifications. For example, the pressure vessel protector can include first connection portions provided in the first protector and each connected to one end of the connector, and second connection portions provided in the second protector and each connected to the other end of the connector.

In some examples, where the first and second connection portions to which the connector is connected are made of a material having higher rigidity (strength) than the material of the first and second protectors, it can be possible to obtain an advantageous effect of inhibiting deformation of and damage to the first and second protectors caused by a coupling force applied by the connector.

In some cases, the pressure vessel protector can have a single-layer structure including a first reinforcing sheet configured to surround the first side part, and a first impregnation layer provided in the first reinforcing sheet and made by impregnating the first reinforcing sheet with a first impregnant. This is to implement the first protector having the single-layer structure including only the single layer while ensuring impact resistance, chemical resistance, flame resistance, and scratch resistance of the first protector.

In some examples, the impact resistance, chemical resistance, the flame resistance, and scratch resistance of the protector can ensure safety and reliability of the pressure vessel. In some cases, it may be difficult to satisfy all of the impact resistance, the chemical resistance, the flame resistance, and the scratch resistance in the case in which the protector is made of a single type of material.

In some examples, a separate reinforcing layer, which is made of a different material from the protector, can be additionally provided on the outer surface of the protector in order to ensure all the flame resistance, the chemical resistance, the impact resistance, and the scratch resistance of the protector. In some cases, the additional application of the reinforcing layer to the outer surface of the protector may cause an increase in size of the protector and deterioration in spatial utilization and degree of design freedom.

In some implementations, the first impregnation layer made by impregnating the first reinforcing sheet with the first impregnant can be provided inside the first reinforcing sheet instead of being provided outside the first reinforcing sheet. Therefore, it can be possible to ensure all of the flame resistance, the chemical resistance, the impact resistance, and the scratch resistance without increasing the size of the first protector.

In some examples, the first reinforcing sheet can be made of at least any one of woven fiberglass fabric and polyurethane foam (PU-Foam). Polyurea resin can be used for the first impregnant used to form the first impregnation layer.

In some implementations, the pressure vessel protector can have a single-layer structure including a second reinforcing sheet configured to surround the second side part, and a second impregnation layer provided in the second reinforcing sheet and made by impregnating the second reinforcing sheet with a second impregnant.

In some examples, the second impregnation layer made by impregnating the second reinforcing sheet with the second impregnant can be provided inside the second reinforcing sheet instead of being provided outside the second reinforcing sheet. Therefore, it can be possible to ensure all the flame resistance, the chemical resistance, the impact resistance, and the scratch resistance without increasing the size of the second protector.

In some examples, the second reinforcing sheet can be made of at least any one of woven fiberglass fabric and polyurethane foam (PU-Foam). Polyurea resin can be used for the second impregnant used to form the second impregnation layer.

DETAILED DESCRIPTION

Hereinafter, exemplary implementations of the present disclosure will be described in detail with reference to the accompanying drawings.

Referring to FIGS. 1 to 6, in some implementations, a pressure vessel assembly 10 can include a pressure vessel 100 including a cylinder 102, a first side dome 104 provided at one end of the cylinder 102 and having a dome shape, and a second side dome 106 provided at the other end of the cylinder 102 and having a dome shape, and a pressure vessel protector 200 configured to protect the first side dome 104 and the second side dome 106.

Figure 1:
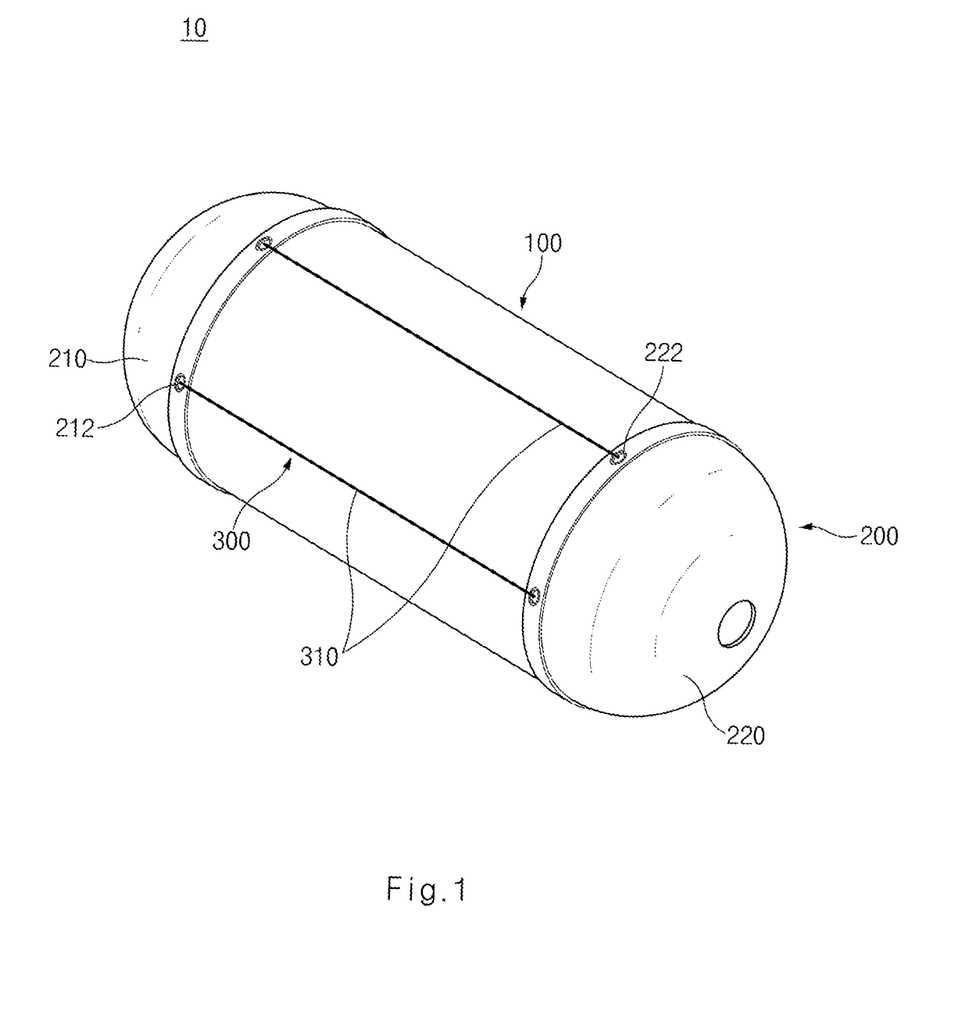
FIG. 1 is a view showing an example of a pressure vessel assembly.

In some examples, the pressure vessel assembly 10 can be used to store a high-pressure fluid (liquid or gas). The present disclosure is not restricted or limited by the type and the properties of the fluid stored in the pressure vessel 100.

Hereinafter, an example will be described in which the pressure vessel assembly 10 is used as a hydrogen tank for a hydrogen storage system applied to mobility vehicles such as various fuel cell vehicles (e.g., a truck), ships, and aircrafts to which a fuel cell stack can be applied.

In some implementations, the pressure vessel 100 can store a high-pressure fluid (e.g., hydrogen) therein. The pressure vessel 100 can have various structures in accordance with conditions and design specifications. The present disclosure is not restricted or limited by the structure of the pressure vessel 100.

In some implementations, the pressure vessel 100 can include a liner 110 having a storage space therein, and a carbon fiber layer 120 configured to surround an outer surface of the liner 110. The pressure vessel 100 can be selectively expanded or contracted depending on a pressure of hydrogen stored in the pressure vessel 100.

In some examples, the liner 110 can have a hollow structure having the storage space therein, and high-pressure compressed hydrogen can be stored in the storage space. The liner 110 can be made of various materials in accordance with conditions and design specifications. The present disclosure is not restricted or limited by the material of the liner 110. For example, the liner 110 can be made of a nonmetallic material such as high-density plastic with excellent restoring force and excellent fatigue resistance. In some implementations, the liner can be made of a metallic material (e.g., aluminum).

In some implementations, the carbon fiber layer 120 can surround the entire outer surface of the liner 110.

For example, the carbon fiber layer 120 can be formed by winding a carbon fiber composite material around the outer surface of the liner 110, and the carbon fiber composite material can be made by impregnating carbon fibers with epoxy, thermosetting resin, and the like.

The structure of the wound carbon fiber composite material and the method of winding the carbon fiber composite material can be variously changed in accordance with conditions and design specifications. The present disclosure is not limited or restricted by the method of winding the carbon fiber composite material.

The carbon fiber layer 120 can be formed by winding multiple layers of the carbon fiber composite material around the outer surface of the liner 110 in various patterns (e.g., clockwise winding, counterclockwise winding, oblique winding, etc.).

For example, the carbon fiber composite material can be wound around the outer surface of the liner 110 by a winding jig. The winding angle of the carbon fiber composite material with respect to the liner 110 can be changed by adjusting an angle (posture) at which the winding jig is disposed with respect to the liner 110.

The carbon fiber composite material wound around the outer surface of the liner 110 is cured through a subsequent heat treatment process, thereby forming the carbon fiber layer 120. As an example, the carbon fiber composite material wound around the outer surface of the liner 110 can be cured by performing the heat treatment at a temperature of 150° C. or higher for a predetermined time.

More specifically, the pressure vessel 100 includes the cylinder 102, the first side dome 104 provided at one end of the cylinder 102 and having a dome shape, and the second side dome 106 provided at the other end of the cylinder 102 and having a dome shape.

The cylinder 102 can have an approximately hollow cylindrical shape. The first side dome 104 having a dome shape is integrally provided at one end (a left end based on FIG. 2) of the cylinder 102. The second side dome 106 having a dome shape is integrally provided at the other end (a right end based on FIG. 2) of the cylinder 102.

In addition, an inlet port through which hydrogen is introduced can be provided at an end of the first side dome 104. An outlet port through which hydrogen is discharged can be provided at an end of the second side dome 106. Various types of components such as valves and tubes can be connected to the inlet port and the outlet port.

In some implementations, the ports (the inlet ports and the outlet ports), through which hydrogen is introduced and discharged, can be respectively provided in the first side dome 104 and the second side dome 106. In some implementations, a common port can be provided in any one of the first side dome and the second side dome, and hydrogen can be introduced and discharged through the common port.

The pressure vessel protector 200 serves to ensure structural rigidity of the first side dome 104 and the second side dome 106, minimize impact to be transmitted to the pressure vessel 100 when the impact is generated by an accident or the like, and minimize damage to and breakage of the pressure vessel 100.

More specifically, the pressure vessel protector 200 includes a first protector 210 configured to surround an outer surface of the first side dome 104, a second protector 220 configured to surround an outer surface of the second side dome 106, and connectors 300 configured to connect the first protector 210 and the second protector 220 with the pressure vessel 100 interposed therebetween.

The first protector 210 covers the outer surface of the first side dome 104.

In some cases, because of the structural characteristics of the dome-shaped first side dome 104 of the pressure vessel 100, it can be difficult to wind a carbon fiber composite material with a sufficient thickness around the first side dome 104, which makes it difficult to ensure sufficient structural rigidity of the first side dome 104. Since the first protector 210 is configured to cover the outer surface of the first side dome 104, it can be possible to obtain an advantageous effect of ensuring structural rigidity of the first side dome 104, minimizing impact to be transmitted to the pressure vessel 100 when the impact is generated by an accident or the like, and minimizing damage to and breakage of the pressure vessel 100.

The first protector 210 can have various structures capable of surrounding the outer surface of the first side dome 104. The present disclosure is not restricted or limited by the structure and shape of the first protector 210.

In particular, the first protector 210 can have a dome shape corresponding to the first side dome 104 and surround the entire outer surface of the first side dome 104. In some implementations, the first protector can partially surround the outer surface of the first side dome.

The second protector 220 covers the outer surface of the second side dome 106.

In some cases, because of the structural characteristics of the dome-shaped second side dome 106 of the pressure vessel 100, it can be difficult to wind a carbon fiber composite material with a sufficient thickness around the second side dome 106, which makes it difficult to ensure sufficient structural rigidity of the second side dome 106. Since the second protector 220 is configured to cover the outer surface of the second side dome 106, it can be possible to obtain an advantageous effect of ensuring structural rigidity of the second side dome 106, minimizing impact to be transmitted to the pressure vessel 100 when the impact is generated by an accident or the like, and minimizing damage to and breakage of the pressure vessel 100.

The second protector 220 can have various structures capable of surrounding the outer surface of the second side dome 106. The present disclosure is not restricted or limited by the structure and shape of the second protector 220.

In particular, the second protector 220 can have a dome shape corresponding to the second side dome 106 and surround the entire outer surface of the second side dome 106. In some examples, the second protector can partially surround the outer surface of the second side dome.

The connectors 300 serve to mechanically connect the first protector 210 and the second protector 220 with the pressure vessel 100 interposed therebetween.

In this case, the configuration in which the first protector 210 and the second protector 220 are connected to each other by the connectors 300 with the pressure vessel 100 interposed therebetween can be understood as a configuration in which an arrangement state of the first protector 210 and the second protector 220 with respect to the pressure vessel 100 is maintained (supported) by the connectors 300.

In other words, the first and second protectors 210 and 220 can be kept in close contact with the outer surfaces of the first and second side domes 104 and 106, respectively, by a supporting force applied by the connectors 300.

Various members capable of mechanically connecting the first and second protectors 210 and 220 can be used as the connector 300. The present disclosure is not restricted or limited by the type and structure of the connector 300.

In some implementations, a connection wire 310 having one end connected to the first protector 210 and the other end connected to the second protector 220 can be used as the connector 300.

In some examples, the connection wire 310 can be variously changed in thickness (diameter) and material in accordance with conditions and design specifications. The present disclosure is not restricted or limited by the thickness (diameter) and material of the connection wire 310.

In particular, the connection wire 310 can be made of a material that can be compressed or stretched in response to contraction or expansion of the pressure vessel 100.

For example, the connection wire 310 can be made of fiberglass or resin. Alternatively, the connection wire 310 can be made of a metallic material or other materials. In some examples, a strap member having a band shape or members having other shapes can be used as the connector.

The connection wire 310 can connect the first and second protectors 210 and 220 in various ways in accordance with conditions and design specifications.

For example, referring to FIG. 1, the connection wire 310 can be provided in plural, and the plurality of connection wires 310 can be spaced apart from one another in a circumferential direction of the cylinder 102 so that the plurality of connection wires 310 is disposed like tightening cords used for the janggu (a traditional Korean musical instrument).

For example, the connection wires 310 can be disposed in parallel with a longitudinal or axial direction of the cylinder 102 and have one end connected to the first protector 210 and the other end connected to the second protector 220.

In some examples, the connection wire can be disposed to be inclined with respect to the longitudinal direction of the cylinder part.

In some implementations (see FIG. 1), the first and second protectors 210 and 220 can be connected to each other by the plurality of connection wires 310. In some implementations, the first and second protectors 210 and 220 can be connected to each other by a single connection wire 310'.

Figure 4:
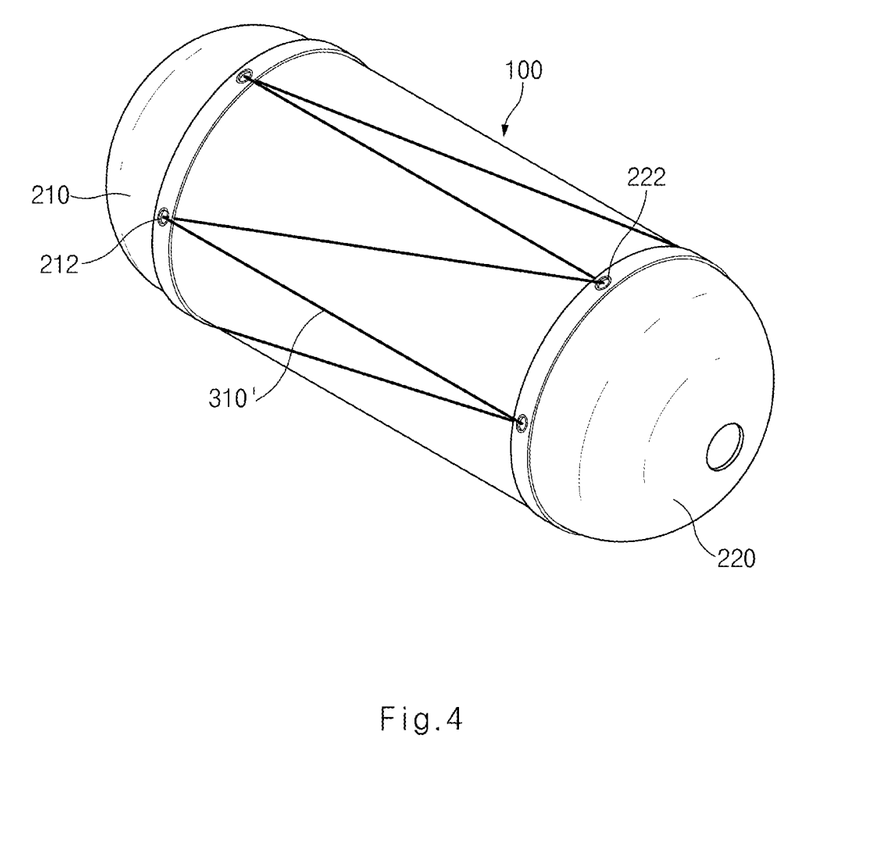
FIG. 4 is a view showing an example of a connection wire of the pressure vessel protector.

For example, referring to FIG. 4, the connection wire 310' can be disposed in a continuous zigzag shape while being alternately connected to the first and second protectors 210 and 220. That is, the connection wire 310' can define a continuous zigzag pattern that alternately extends from a portion of the first protector 210 to a portion of the second protector 220 and from the portion of the second protector 220 to another portion of the first protector 210.

For example, the connection wire 310' can repeatedly extend in a zigzag manner along first paths parallel to the longitudinal direction of the cylinder 102 and second paths inclined with respect to a direction opposite to the direction of the first path (inclined with respect to the longitudinal direction of the cylinder part), such that the connection wire 310' can continuously connect the first and second protectors 210 and 220.

The connection structure for connecting the first and second protectors 210 and 220 and the connector 300 (e.g., the connection wire) can be variously changed in accordance with conditions and design specifications. The present disclosure is not restricted or limited by the connection structure between the first and second protectors 210 and 220 and the connector 300.

Figure 2:
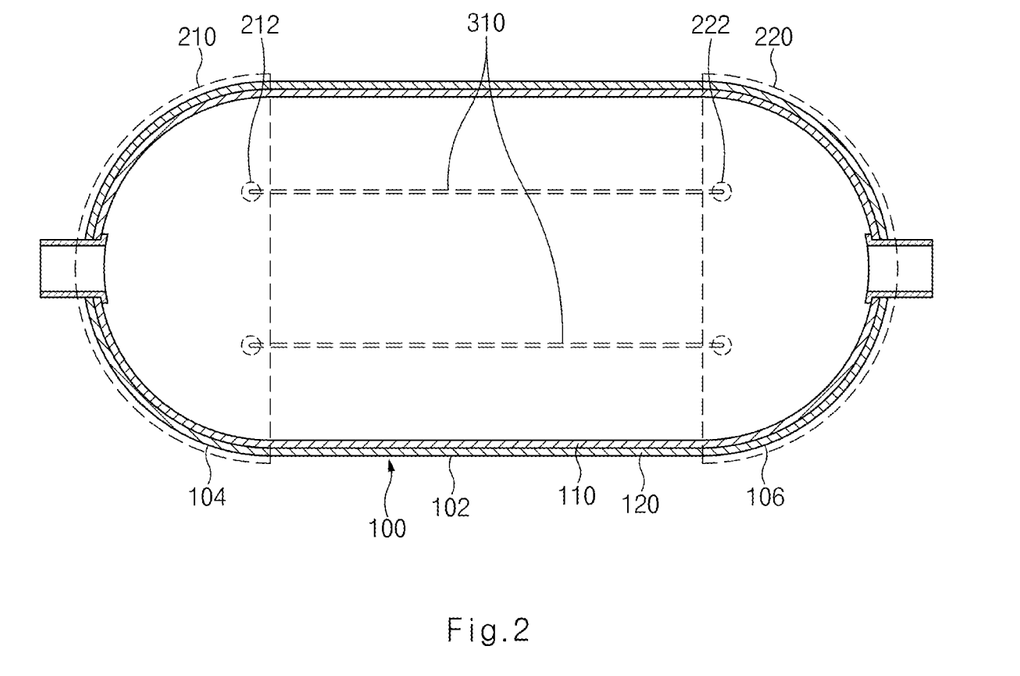
FIG. 2 is a view showing an example of a pressure vessel protector.
Figure 3:
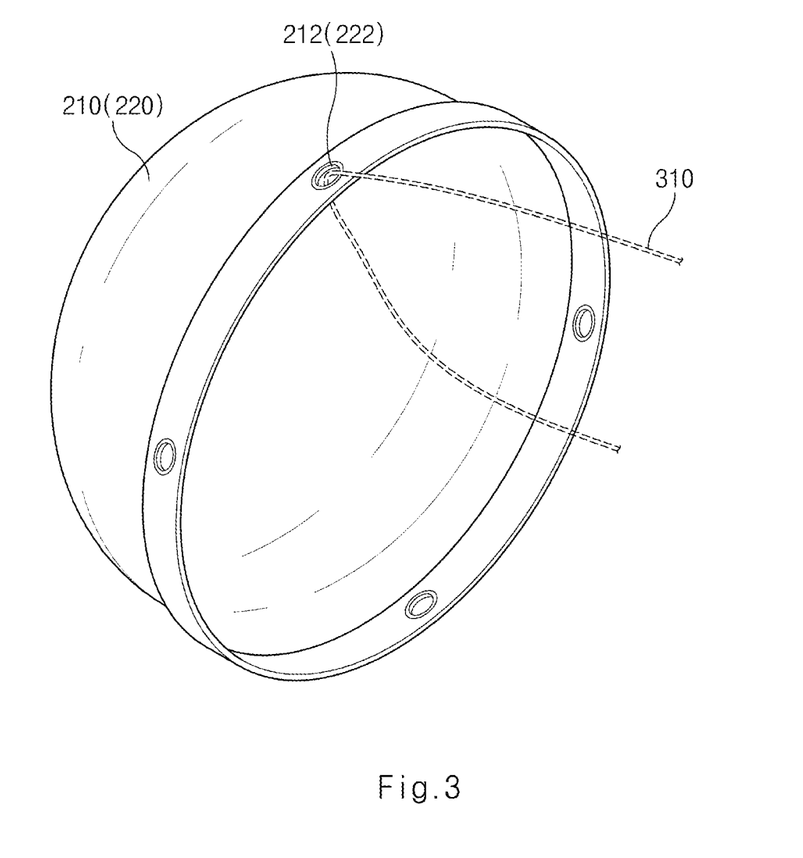
FIG. 3 is a view showing an example of a connection portion of the pressure vessel protector.

Referring to FIGS. 1 to 3, in some implementations, the pressure vessel protector 200 can include first connection portions 212 that are provided in the first protector 210 and each connected to one end of the connector 300, and second connection portions 222 that are provided in the second protector 220 and each connected to the other end of the connector 300.

The first and second connection portions 212 and 222 can each be provided in the form of a hole, a groove, a protrusion, a stepped portion, or the like by which the connector 300 can be caught (locked or fastened). The present disclosure is not restricted or limited by the structures and shapes of the first and second connection portions 212 and 222.

For example, referring to FIG. 3, a ring-shaped eyelet having a through-hole through which the connector 300 can pass can be used as the first and second connection portions 212 and 222. The connector 300 can be bound to the first and second connection portions 212 and 222 while passing through the through-holes.

In some examples, the ends of the connector 300 can be bound by separate binding members (e.g., wire sleeves, wire clips, push nuts). In some examples, the end of the connector can be tied in a knot and bound to each of the first and second connection portions.

In particular, the first connection portion 212 can be made of a material having higher rigidity than the material of the first protector 210, and the second connection portion 222 can be made of a material having higher rigidity than the material of the second protector 220.

For example, the first and second connection portions 212 and 222 can be made of a metallic material (e.g., steel or alloy) having higher rigidity (strength) than the material of the first and second protectors 210 and 220.

Since the first and second connection portions 212 and 222 to which the connector 300 is connected are made of a material having higher rigidity (strength) than the material of the first and second protectors 210 and 220 as described above, it can be possible to obtain an advantageous effect of inhibiting deformation of and damage to the first and second protectors 210 and 220 caused by a coupling force applied by the connector 300.

Figure 5:
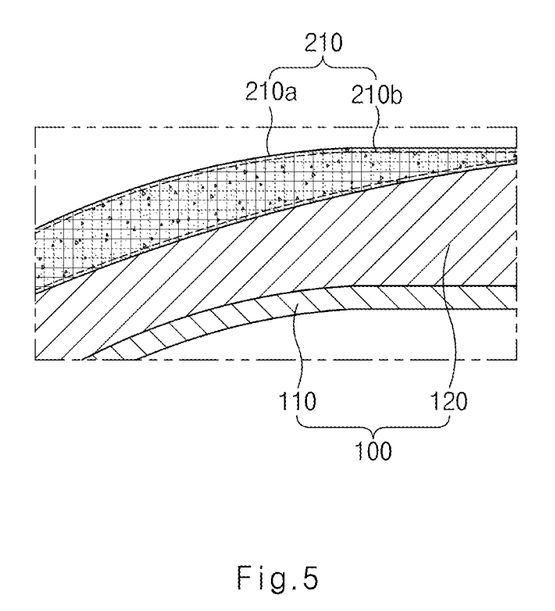
FIG. 5 is a cross-sectional view showing an example of a first protector of the pressure vessel protector.

Referring to FIG. 5, in some implementations, the pressure vessel protector 200 can have a single-layer structure including a first reinforcing sheet 210a configured to surround the first side dome 104, and a first impregnation layer 210b provided in the first reinforcing sheet 210a and made by impregnating the first reinforcing sheet 210a with a first impregnant.

This is to implement the first protector 210 having the single-layer structure including only the single layer while ensuring impact resistance, chemical resistance, flame resistance, and scratch resistance of the first protector 210.

In some examples, the impact resistance, chemical resistance, the flame resistance, and scratch resistance of the protector may ensure safety and reliability of the pressure vessel 100. However, in some cases, it can be difficult to satisfy all of the impact resistance, the chemical resistance, the flame resistance, and the scratch resistance in the case in which the protector is made of a single type of material.

In some cases, a separate reinforcing layer, which is made of a different material from the protector, can be additionally provided on the outer surface of the protector in order to ensure all the flame resistance, the chemical resistance, the impact resistance, and the scratch resistance of the protector. However, in some cases, the additional application of the reinforcing layer to the outer surface of the protector may lead to an increase in size of the protector and deterioration in spatial utilization and degree of design freedom.

In some implementations, the first impregnation layer 210b can be made by impregnating the first reinforcing sheet 210a with the first impregnant, which can be provided inside the first reinforcing sheet 210a instead of being provided outside the first reinforcing sheet 210a. Therefore, it can be possible to ensure all the flame resistance, the chemical resistance, the impact resistance, and the scratch resistance without increasing the size of the first protector 210.

For example, the first reinforcing sheet 210a can be made of a material having chemical resistance and scratch resistance, and the first impregnation layer 210b can be made of a material having flame resistance (flame retardancy) and impact resistance.

In some implementations, the first reinforcing sheet 210a can be made of at least any one of woven fiberglass fabric and polyurethane foam (PU-Foam). Polyurea resin can be used for the first impregnant (impregnated material) used to form the first impregnation layer 210b.

For example, the woven fiberglass fabric made by weaving fiberglass can be used for the first reinforcing sheet 210a, and polyurea resin can be used for the first impregnant used to form the first impregnation layer 210b.

Alternatively, polyurethane foam (PU-Foam) can be used for the first reinforcing sheet 210a, and polyurea resin can be used for the first impregnant used to form the first impregnation layer 210b.

In some examples, the woven fiberglass fabric can be variously changed in woven shape and structure in accordance with conditions and design specifications. The present disclosure is not restricted or limited by the woven shape and structure of the woven fiberglass fabric. For example, the woven fiberglass fabric can be woven in the form of a lattice.

In addition, various types of additives (e.g., a halogen-based flame retardant and a phosphate-based flame retardant) can be added to the first impregnant (e.g., polyurea resin) to ensure flame retardancy and impact resistance. The present disclosure is not restricted or limited by the types and properties of the additives added to the first impregnant.

The method of manufacturing the first protector 210 can be variously changed in accordance with conditions and design specifications. The present disclosure is not restricted or limited by the method of manufacturing the first protector 210.

For example, the first protector 210 can be formed by tightly attaching (or winding) the first reinforcing sheet 210a, which is impregnated with the first impregnant, on the outer surface of the first side dome 104 and then curing the first reinforcing sheet 210a and the first impregnant at room temperature.

As described above, the first protector 210 can be provided on the outer surface of the first side dome 104 instead of a fiberglass layer. Therefore, it can be possible to obtain an advantageous effect of simplifying the structure and the manufacturing process. In particular, it can be possible to exclude a process of winding fiberglass around the outer surface of the first side dome 104 and a curing process using a heat treatment chamber. Therefore, it can be possible to obtain an advantageous effect of improving the manufacturing efficiency, shortening the manufacturing time, and reducing the manufacturing costs.

Figure 6:
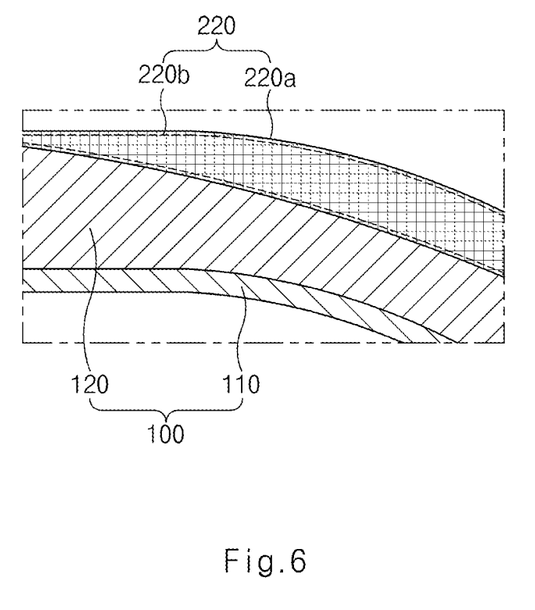
FIG. 6 is a cross-sectional view showing an example of a second protector of the pressure vessel protector.

Referring to FIG. 6, in some implementations, the pressure vessel protector 200 can have a single-layer structure including a second reinforcing sheet 220a configured to surround the second side dome 106, and a second impregnation layer 220b provided in the second reinforcing sheet 220a and made by impregnating the second reinforcing sheet 220a with a second impregnant.

This is to implement the second protector 220 having the single-layer structure including only the single layer while ensuring impact resistance, chemical resistance, flame resistance, and scratch resistance of the second protector 220.

In some examples, the impact resistance, chemical resistance, flame resistance and scratch resistance of the protector can ensure safety and reliability of the pressure vessel 100. However, in some cases, it can be difficult to satisfy all the impact resistance, the chemical resistance, the flame resistance, and the scratch resistance in the case in which the protector is made of a single type of material.

In some examples, a separate reinforcing layer, which is made of a different material from the protector, can be additionally provided on the outer surface of the protector in order to ensure all the flame resistance, the chemical resistance, the impact resistance, and the scratch resistance of the protector. However, in some cases, the additional application of the reinforcing layer to the outer surface of the protector may lead to an increase in size of the protector and deterioration in spatial utilization and degree of design freedom.

In some implementations, the second impregnation layer 220b can be made by impregnating the second reinforcing sheet 220a with the second impregnant, which can be provided inside the second reinforcing sheet 220a instead of being provided outside the second reinforcing sheet 220a. Therefore, it can be possible to ensure all the flame resistance, the chemical resistance, the impact resistance, and the scratch resistance without increasing the size of the second protector 220.

For example, the second reinforcing sheet 220a can be made of a material having chemical resistance and scratch resistance, and the second impregnation layer 220b can be made of a material having flame resistance (flame retardancy) and impact resistance.

In particular, the woven fiberglass fabric made by weaving fiberglass can be used for the second reinforcing sheet 220a, and polyurea resin can be used for the second impregnant (impregnated material) used to form the second impregnation layer 220b.

In some implementations, the second reinforcing sheet 220a can be made of at least any one of woven fiberglass fabric and polyurethane foam (PU-Foam). Polyurea resin can be used for the second impregnant (impregnated material) used to form the second impregnation layer 220b.

For example, the woven fiberglass fabric made by weaving fiberglass can be used for the second reinforcing sheet 220a, and polyurea resin can be used for the second impregnant used to form the second impregnation layer 220b.

Alternatively, polyurethane foam (PU-Foam) can be used for the second reinforcing sheet 220a, and polyurea resin can be used for the second impregnant used to form the second impregnation layer 220b.

In some examples, the woven fiberglass fabric can be variously changed in woven shape and structure in accordance with conditions and design specifications. The present disclosure is not restricted or limited by the woven shape and structure of the woven fiberglass fabric. For example, the woven fiberglass fabric can be woven in the form of a lattice.

In addition, various types of additives (e.g., a halogen-based flame retardant and a phosphate-based flame retardant) can be added to the second impregnant (e.g., polyurea resin) to ensure flame retardancy and impact resistance. The present disclosure is not restricted or limited by the types and properties of the additives added to the second impregnant.

In some implementations, the first and second reinforcing sheets 210a and 220a can be made of the same material (e.g., woven fiberglass fabric), and the first and second impregnation layers 210b and 220b are also made of the same material (e.g., polyurea resin). In some examples, the first and second reinforcing sheets can be made of different materials, or the first and second impregnation layers can be made of different materials.

The method of manufacturing the second protector 220 can be variously changed in accordance with conditions and design specifications. The present disclosure is not restricted or limited by the method of manufacturing the second protector 220.

For example, the second protector 220 can be formed by tightly attaching (or winding) the second reinforcing sheet 220a, which is impregnated with the second impregnant, on the outer surface of the second side dome 106 and then curing the second reinforcing sheet 220a and the second impregnant at room temperature.

As described above, the second protector 220 can be provided on the outer surface of the second side dome 106 instead of a fiberglass layer. Therefore, it can be possible to obtain an advantageous effect of simplifying the structure and the manufacturing process. In particular, it can be possible to exclude a process of winding fiberglass around the outer surface of the second side dome 106 and a curing process using a heat treatment chamber. Therefore, it can be possible to obtain an advantageous effect of improving the manufacturing efficiency, shortening the manufacturing time, and reducing the manufacturing costs.

In some implementations, the pressure vessel or the pressure vessel assembly can help to obtain an advantageous effect of inhibiting damage to and breakage of the pressure vessel and improving safety and reliability of the pressure vessel. In particular, it can be possible to obtain an advantageous effect of ensuring and improving structural rigidity and durability of the side dome of the pressure vessel and reducing impact to be transmitted to the pressure vessel when the impact is generated by an accident or the like.

In some implementations, the protector can be brought into close contact with the side dome of the pressure vessel without using a separate bonding agent. Therefore, it can be possible to obtain an advantageous effect of minimizing the occurrence of abnormal noise when the pressure vessel is contracted or expanded.

In some implementations, the pressure vessel or the pressure vessel assembly can help to contribute to the reduction in weight and size of the pressure vessel. In some examples, the pressure vessel or the pressure vessel assembly can help to obtain an advantageous effect of simplifying the manufacturing process and reducing the manufacturing time. For example, the pressure vessel or the pressure vessel assembly can help to obtain an advantageous effect of improving the manufacturing efficiency and reducing the manufacturing costs.

While the implementations have been described above, the implementations are just illustrative and not intended to limit the present disclosure. It can be appreciated by those skilled in the art that various modifications and applications, which are not described above, can be made to the present implementation without departing from the intrinsic features of the present implementation. For example, the respective constituent elements specifically described in the implementations can be modified and then carried out. Further, it should be interpreted that the differences related to the modifications and applications are included in the scope of the present disclosure defined by the appended claims.

What is claimed is:

1. A pressure vessel assembly comprising:
a pressure vessel comprising:
a cylinder,
a first side dome that is disposed at a first end of the cylinder and defines a first dome shape, and
a second side dome that is disposed at a second end of the cylinder and defines a second dome shape;
a first protector that surrounds an outer surface of the first side dome;
a second protector that surrounds an outer surface of the second side dome, the pressure vessel being disposed between the first protector and the second protector;
a connector that connects the first protector and the second protector to each other;
a plurality of first connection portions that are disposed at the first protector and connected to a first end of the connector; and
a plurality of second connection portions that are disposed at the second protector and connected to a second end of the connector,
wherein each of the plurality of first connection portions and the plurality of second connection portions comprises a ring-shaped eyelet that defines a through-hole which the connector passes through,
wherein the connector is configured to directly pull the ring-shaped eyelet provided at the first protector and the ring-shaped eyelet provided at the second protector toward each other to thereby restrict the first protector and the second protector to the cylinder, and
wherein the connector comprises a connection wire that connects the first protector to the second protector, the connection wire defining a continuous zigzag pattern that alternately extends (i) from a portion of the first protector to a portion of the second protector and (ii) from the portion of the second protector to another portion of the first protector.

2. The pressure vessel assembly of claim 1, wherein the plurality of first connection portions are made of a material having a higher rigidity than a material of the first protector, and
wherein the plurality of second connection portions are made of a material having a higher rigidity than a material of the second protector.

3. The pressure vessel assembly of claim 1, wherein the first protector has a single-layer structure that comprises:
a first reinforcing sheet that surrounds the outer surface of the first side dome and includes a first impregnant impregnated into and disposed inside the first reinforcing sheet.

4. The pressure vessel assembly of claim 3, wherein the first reinforcing sheet comprises at least one of woven fiberglass fabric or polyurethane foam, and
wherein the first impregnant comprises polyurea resin.

5. The pressure vessel assembly of claim 1, wherein the second protector comprises:
a second reinforcing sheet that surrounds the outer surface of the second side dome; and
a second impregnation layer that comprises a second impregnant disposed in the second reinforcing sheet.

6. The pressure vessel assembly of claim 5, wherein the second reinforcing sheet comprises at least one of woven fiberglass fabrics or polyurethane foam, and
wherein the second impregnant comprises polyurea resin.

7. The pressure vessel assembly of claim 1, wherein the connector is in contact with an outer circumferential surface of the cylinder.

8. The pressure vessel assembly of claim 1, wherein the pressure vessel comprises:
- a liner that defines a storage space therein; and
- a carbon fiber layer that surrounds an outer surface of the liner, the carbon fiber layer having an outer surface that defines at least a portion of the cylinder, the first side dome, or the second side dome,
- wherein the first protector surrounds a first portion of the outer surface of the carbon fiber layer defining the first side dome, and
- wherein the second protector surrounds a second portion of the outer surface of the carbon fiber layer defining the second side dome.

9. The pressure vessel assembly of claim 1, wherein the plurality of first connection portions define a plurality of first through-holes, respectively, the plurality of first through-holes including the through-hole,
- wherein the plurality of second connection portions define a plurality of second through-holes, respectively, and
- wherein the connector comprises a plurality of connection wires that are spaced apart from one another in a circumferential direction of the cylinder, each of the plurality of connection wires connecting one of the plurality of first through-holes and one of the plurality of second through-holes to each other.

10. A pressure vessel protector for a pressure vessel, the pressure vessel including a cylinder, a first side dome that is disposed at a first end of the cylinder and defines a first dome shape, and a second side dome that is disposed at a second end of the cylinder and defines a second dome shape, the pressure vessel protector comprising:
- a first protector configured to surround an outer surface of the first side dome;
- a second protector configured to surround an outer surface of the second side dome;
- a connector configured to connect the first protector and the second protector to each other such that the pressure vessel is disposed between the first protector and the second protector;
- a plurality of first connection portions that are disposed at the first protector and connected to a first end of the connector; and
- a plurality of second connection portions that are disposed at the second protector and connected to a second end of the connector,
- wherein each of the plurality of first connection portions and the plurality of second connection portions comprises a ring-shaped eyelet that defines a through-hole which the connector passes through,
- wherein the connector is configured to directly pull the ring-shaped eyelet provided at the first protector and the ring-shaped eyelet provided at the second protector toward each other to thereby restrict the first protector and the second protector to the cylinder, and
- wherein the connector comprises a connection wire that connects the first protector to the second protector, the connection wire defining a continuous zigzag pattern that alternately extends (i) from a portion of the first protector to a portion of the second protector and (ii) from the portion of the second protector to another portion of the first protector.

11. The pressure vessel protector of claim 10, wherein the first protector comprises:
- a first reinforcing sheet configured to surround the outer surface of the first side dome; and
- a first impregnation layer that comprises a first impregnant disposed in the first reinforcing sheet, and
- wherein the second protector comprises:
  - a second reinforcing sheet configured to surround the outer surface of the second side dome, and
  - a second impregnation layer comprises a second impregnant disposed in the second reinforcing sheet.

12. The pressure vessel protector of claim 11, wherein each of the first reinforcing sheet and the second reinforcing sheet comprises at least one of woven fiberglass fabric or polyurethane foam, and
- wherein each of the first impregnant and the second impregnant comprises polyurea resin.

13. A pressure vessel assembly comprising:
- a pressure vessel comprising:
  - a cylinder,
  - a first side dome that is disposed at a first end of the cylinder and defines a first dome shape, and
  - a second side dome that is disposed at a second end of the cylinder and defines a second dome shape;
- a first protector that surrounds an outer surface of the first side dome;
- a second protector that surrounds an outer surface of the second side dome, the pressure vessel being disposed between the first protector and the second protector;
- a connector that connects the first protector and the second protector to each other;
- a plurality of first connection portions that are disposed at the first protector and connected to a first end of the connector; and
- a plurality of second connection portions that are disposed at the second protector and connected to a second end of the connector,
- wherein each of the plurality of first connection portions and the plurality of second connection portions comprises a ring-shaped eyelet that defines a through-hole which the connector passes through,
- wherein the connector is configured to directly pull the ring-shaped eyelet provided at the first protector and the ring-shaped eyelet provided at the second protector toward each other to thereby restrict the first protector and the second protector to the cylinder,
- wherein the plurality of first connection portions define a plurality of first through-holes, respectively, the plurality of first through-holes including the through-hole,
- wherein the plurality of second connection portions define a plurality of second through-holes, respectively, and
- wherein the connector comprises a connection wire that alternately passes through the plurality of first through-holes and the plurality of second through-holes and that extends along an outer circumferential surface of the cylinder.

* * * * *